Patented Dec. 22, 1936

2,065,249

UNITED STATES PATENT OFFICE 2,065,249

TREATING PETROLEUM DISTILLATES

John P. Smoots, Cleveland, Ohio, assignor to The Standard Oil Company, Cleveland, Ohio, a corporation of Ohio No Drawing. Application August 23, 1929,
Serial No. 387,932

11 Claims. (Cl. 44—9)

Where petroleum is subjected to pyrogenetic decomposition, as for instance in the modern processes of cracking gas oil and the like, there is found to be a tendency for the products to develop more or less gum formation, such gum becoming manifest on evaporation, and occasionally tending to give trouble by depositing in the intake manifold, and on the valves and valve stems, of engines using such material for fuel. This gum formation tendency in certain instances is found to be accentuated on prolonged storage. An effective means for preventing or inhibiting such condition is fundamentally important and highly desirable; and in accordance with the present invention products may be had which highly satisfactorily meet such needs.

To the accomplishment of the foregoing and related ends, the invention, then, consists of the features hereinafter fully described, and particularly pointed out in the claims, the following description setting forth in detail certain embodiments of the invention, these being illustrative, however, of but a few of the various ways in which the principle of the invention may be employed.

In proceeding in accordance with my invention, the cracked petroleum distillate, such as is of the character prone to develop gum-formation, is subjected to the action of an organic compound inhibitive of such tendency and result. As such treating compound there may be employed a hydroxy compound, more particularly a benzene derivative or benzene homologue derivative with a hydroxyl in the ortho position and another hydroxyl or amino group, or a double ring compound with a hydroxyl in the alpha position. A di-hydroxy phenol, as catechol, or a tri-hydroxy phenol, as pyrogallol, or a naphthalene derivative as α-naphthol, or anthracene derivatives, as anthragallol, may be particularly well employed.

The amount of such agent required is small, for instance 0.0004 to 0.5 per cent. In general, therefore, it is not necessary to exceed one-half of one per cent., or at the outside one per cent. Since these agents are in some instances solid compounds, a desirable method of incorporating the material into the petroleum distillate may involve first dissolving or incorporating the agent with a suitable solvent, for instance conveniently, ether, ethyl alcohol or methyl alcohol, benzol or the like, and such solution may then be mixed with the petroleum. For effective proportional mixing, while the proper amount for a charge for a given batch of the petroleum may be simply added in bulk to the petroleum in a container, and the mixture be suitably agitated to a good degree of dissemination, preferably I incorporate the liquid to be added, by a proportional feeding of the same into a flowing stream of the petroleum.

A basic compound, especially an organic base, is also desirably added in many cases. Thus, a hydroxy compound, or more particularly a dihydroxy benzene derivative, and a basic material, preferably an organic base, as anilin or analogous compound, o-toluidin, di-methyl anilin, etc., may advantageously be used in conjunction with each other.

As an example: 15 lbs. of pyrogallol and 25 lbs. of anilin are dissolved in a solvent to make up substantially ten gallons volume, and this is fed proportionally into 2500 barrels of gasoline.

Similarly, as indicated, any of the various agents contemplated, whether hydroxy or di-hydroxy phenols in ortho position, tri-hydroxy phenols, naphthols, anthracene hydroxyl derivatives, etc., can be incorporated, and cracked distillates be so treated, and with a resultant inhibition of the tendency of the gum-formation when partially or completely evaporated in the presence of small amounts of iron or copper, and with avoidance of such gums as tend to run down valve stems and cause sticking of valves in internal combustion engines.

Other forms of applying the principle of my invention may be employed instead of the one explained, change being made as regards the details disclosed, provided the features set forth in any of the following claims, or the equivalent of such stated features be employed.

I therefore particularly point out and distinctly claim as my invention:—

1. As a new product, a motor fuel of cracked petroleum distillate treated with an organic base comprising a mono cyclic aromatic amine and another compound selected from the group consisting of alpha naphthol and pyrogallol.

2. As a new product, a motor fuel of cracked petroleum distillate treated with alpha-naphthol and an organic base comprising a mono cyclic aromatic amine.

3. As a new product, a motor fuel of cracked petroleum distillate treated with pyrogallol in the presence of an agent favoring reaction thereby, such agent comprising an amine.

4. As a new product, a motor fuel of cracked petroleum distillate treated with alpha-naphthol and aniline.

5. As a new product, a motor fuel of cracked petroleum distillate treated with pyrogallol in the presence of an agent favoring reaction thereby, such agent comprising aniline.

6. A process of inhibiting gum-formation in motor fuel, which comprises subjecting such motor fuel to the action of an organic base comprising a mono cyclic aromatic amine and another compound selected from the group consisting of alpha naphthol and pyrogallol.

7. A process of inhibiting gum-formation in motor fuel, which comprises subjecting such motor fuel to the action of alpha-naphthol and an organic base comprising a mono cyclic aromatic amine.

8. A process of inhibiting gum-formation in motor fuel, which comprises subjecting such motor fuel to the action of pyrogallol in the presence of an agent favoring reaction thereby, such agent comprising an amine.

9. A process of inhibiting gum-formation in motor fuel, which comprises dissolving alpha-naphthol and an organic base comprising a mono cyclic aromatic amine in a solvent, and proportionally mixing such solution into the motor fuel.

10. A process of inhibiting gum-formation in motor fuel which comprises dissolving pyrogallol and an amine in a solvent and proportionally mixing such solution into the motor fuel.

11. A cracked gasoline normally tending to deteriorate and form gum and containing as an inhibitor thereof in combination a hydroxy aryl compound and an organic base comprising a mono cyclic aromatic amine in quantity sufficient to retard such gum formation.

JOHN P. SMOOTS.